United States Patent [19]

Nakano et al.

[11] 4,426,973
[45] Jan. 24, 1984

[54] METHOD OF AND APPARATUS FOR CONTROLLING THE IGNITION TIMING OF AN INTERNAL COMBUSTION ENGINE

[75] Inventors: Jiro Nakano; Hideo Miyagi, both of Okazaki; Hironobu Ono, Toyota, all of Japan

[73] Assignee: Toyota Jidosha Kogyo Kabushiki Kaisha, Toyota, Japan

[21] Appl. No.: 303,494

[22] Filed: Sep. 18, 1981

[30] Foreign Application Priority Data

Sep. 25, 1980 [JP] Japan .................. 55-132272

[51] Int. Cl.³ ............................ F02P 5/04
[52] U.S. Cl. ....................... 123/418; 123/415; 123/416; 123/417
[58] Field of Search ............... 123/415, 416, 417, 418

[56] References Cited

U.S. PATENT DOCUMENTS

| 4,104,998 | 10/1978 | Fenn ................... 123/415 |
| 4,158,350 | 6/1979 | Moller .................. 123/418 |
| 4,267,569 | 5/1981 | Baumann ............... 123/417 |
| 4,274,141 | 8/1981 | Tokuda et al. .......... 123/415 |
| 4,339,801 | 7/1982 | Hosaka ................. 123/417 |
| 4,359,988 | 11/1982 | Matsubara ............. 123/417 |

FOREIGN PATENT DOCUMENTS

| 2007400 | 5/1979 | United Kingdom ........ 123/415 |
| 2030644 | 4/1980 | United Kingdom ........ 123/415 |

Primary Examiner—Ronald B. Cox
Attorney, Agent, or Firm—Cushman, Darby & Cushman

[57] ABSTRACT

The ignition timing of an internal combustion engine is set to a fixed value if a predetermined signal is applied to a predetermined input terminal for servicing the ignition timing. However, if the engine is not in the idling condition, the ignition timing is controlled, as usual, depending upon the operating condition of the engine, even when the predetermined signal is applied to the service input terminal.

18 Claims, 6 Drawing Figures

METHOD OF AND APPARATUS FOR CONTROLLING THE IGNITION TIMING OF AN INTERNAL COMBUSTION ENGINE

BACKGROUND OF THE INVENTION

The present invention relates to a method of an apparatus for controlling the ignition timing of an internal combustion engine.

A well-known ignition timing control system of an internal combustion engine controls the ignition timing by detecting the flow rate of the intake air or the pneumatic pressure in the intake manifold and the rotational speed as engine parameters indicative of operation conditions. An optimum ignition timing is calculated from the detected engine parameters using a function which represents a relationship of optimum ignition timing relative to the engine parameters. The ignition timing is adjusted responsive to the calculated value. In general, systems of this type are provided with a service input terminal (IS terminal) for initially adjusting the ignition timing in the factory or for servicing the ignition timing. If a predetermined electrical signal is applied to the IS terminal, e.g., a ground-potential signal (signal having positive logic of "0"), by grounding the IS terminal using a specially designed detachable connector, the ignition timing control system controls the ignition timing to a fixed ignition timing irrespective of the operating condition of the engine. Therefore, it becomes possible to adjust or to service the reference position of the crank angle and to adjust the ignition timing.

However, if the detachable connector is inadvertently not removed after the adjustment has been finished, and if the operation of the engine is continued with the predetermined signal being applied to the IS terminal, the ignition remains at the fixed timing, which gives rise to the occurrence of overheating of the engine, misfire, and damage to the ignition system by heat.

SUMMARY OF THE INVENTION

It is, therefore, an object of the present invention to provide a method of and apparatus for controlling the ignition timing of an internal combustion engine, whereby overheating and misfiring can be prevented from occurring and the ignition system can be prevented from being damaged, even when the engine is operated without cutting off the predetermined signal applied to the service input terminal.

According to the present invention, the operating conditions of the engine are detected and at least one first electrical signal is produced which indicates the detected operating condition. In response to the produced first electrical signal, a spark advance angle is calculated which corresponds to an optimum ignition timing at the detected operating condition. Also, whether or not the engine is in the idling condition is detected and a second electrical signal is produced indicating whether or not the engine is in the idling condition. In response to the second electrical signal, if the engine is not in the idling condition, the timing of sparks applied to the engine is adjusted depending upon the calculated spark advance angle even when a predetermined electrical signal is applied to the service input terminal.

The above and other related objects and features of the present invention will be apparent from the description of the present invention set forth below, with reference to the accompanying drawings, as well as from the appended claims.

DETAILED DESCRIPTION OF THE PREFERRED EMBODIMENTS

Figure 1:
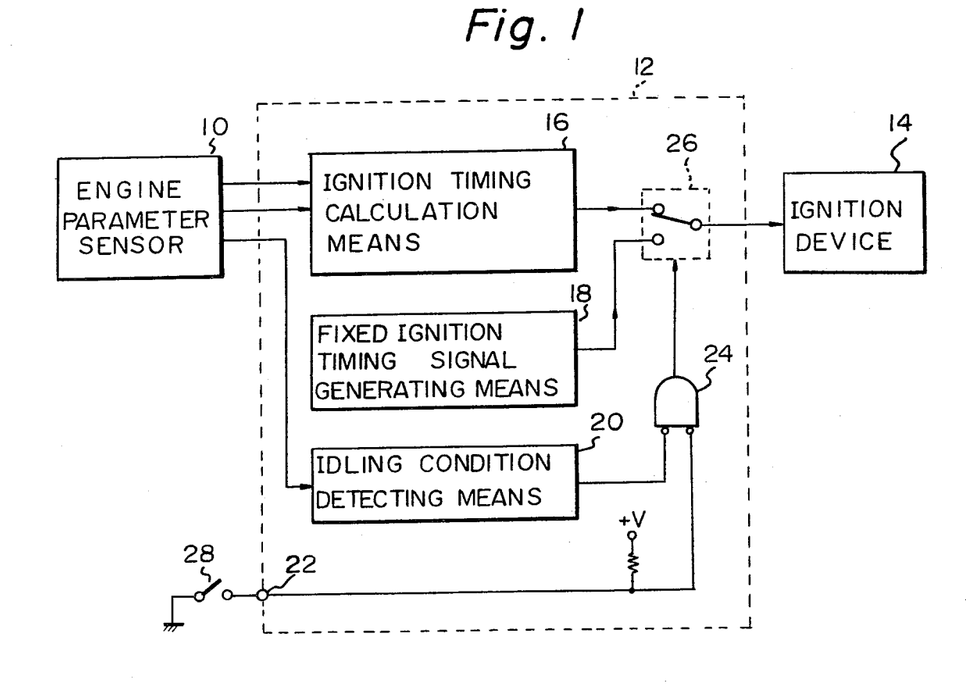
FIG. 1 is a block diagram illustrating a basic concept of the present invention.

Referring to FIG. 1 which represents a fundamental concept of the present invention, reference numeral 10 denotes a sensor for detecting engine parameters indicative of the operating condition of the engine, 12 denotes an electronic control unit for producing ignition signals, and 14 denotes an ignition device composed of an igniter that controls on and off a primary current for the ignition coil depending upon ignition signals applied thereto, an ignition coil, a distributor and spark plugs. The engine parameter sensor 10 includes a sensor which detects the rotational speed of the engine, and a sensor which detects the flow rate of the intake air or the pneumatic pressure in the intake manifold, in order to calculate the ignition timing. The engine parameter sensor 10 further includes a sensor which detects any one of the above engine parameter, a sensor which detects whether or not a throttle valve (not shown) is at an idling position, a sensor which detects whether an automatic transmission is shifted in the neutral range or the parking range (in the case of a vehicle equipped with an automatic transmission system), or a sensor which detects whether or not the vehicle speed is higher than a predetermined speed, in order to detect whether the engine is in the idling condition. The electronic control unit 12 includes an ignition timing calculation means 16 for calculating an optimum ignition timing responsive to engine parameter signals fed from the sensor 10, which signals represent the rotational speed of the engine and the flow rate of the intake air or the pneumatic pressure in the intake manifold. The calculation means 16 then produces an ignition signal which indicates the calculated ignition timing. The control unit 12 further includes a fixed ignition timing signal generating means 18 which produces an ignition signal that indicates a predetermined fixed ignition timing, and an idling condition detecting means 20 which receives parameter signals from the sensor 10 to detect whether the engine is in the idling condition wherein the ignition timing can be serviced. The control unit 12 also includes a service input terminal (IS terminal) 22 for receiving IS signals, a gate means 24 which finds the logical product of the output signal of the idling condition detecting means 20 and the IS signal, and a switching means 26 which selectively sends to the ignition device 14 an ignition signal from the ignition timing calculation means 16 or an ignition signal from the fixed ignition timing signal generating means 18 depending upon the output of the gate means 24. When the sensor for detecting whether the engine is in the idling condition employed in the sensor 10 is of the type which produces a voltage corresponding to the rotational speed of the engine, the flow rate of the intake air of the pnuematic pressure in the intake manifold, the idling condition detecting means 20 will be made up of a comparator which compares the voltage of the above sensor with a reference voltage to detect whether the engine is in the idling condition. When the sensor for detecting whether the engine is in the idling condition is of the type which generates a logic output of "0" or "1" depending upon whether the throttle valve is at the idling position or not, or whether the shift position of the automatic transmission is in the neutral range or the parking range, however, there is no need of necessarily providing the idling condition detecting means 20. It will be necessary to provide a logic circuit when the idling condition is to be detected from the outputs of two or more sensors.

When the IS terminal 22 is grounded by a switch 28 or by a detachable connector, a signal of the logic level of "0" is applied to the gate means 24. When the idling condition is detected by the detecting means 20, a signal of the logic level "0" is also applied to the gate means 24. Therefore, in this case, the gate means 24 which functions as a NAND gate in this example produces an output of the logic level of "1", whereby the switching means 26 is changed to the side of the fixed ignition timing signal generating means 18, and ignition signals of fixed ignition timing are fed to the ignition device 14. Even when the input terminal 22 is left grounded, the detecting means 20 produces signals of the logic level of "1" if the engine is not in the idling condition. The switching means 26 therefore is switched to the side of the ignition timing calculation means 16 and the ignition signals are fed to the ignition device 14. Therefore, even when the switch 28 for service is inadvertently left on the "on" state or even when someone forgets to remove the detachable connector, the engine is not overheated, misfire does not develop, and the ignition system is not damaged by the heat.

Figure 2:
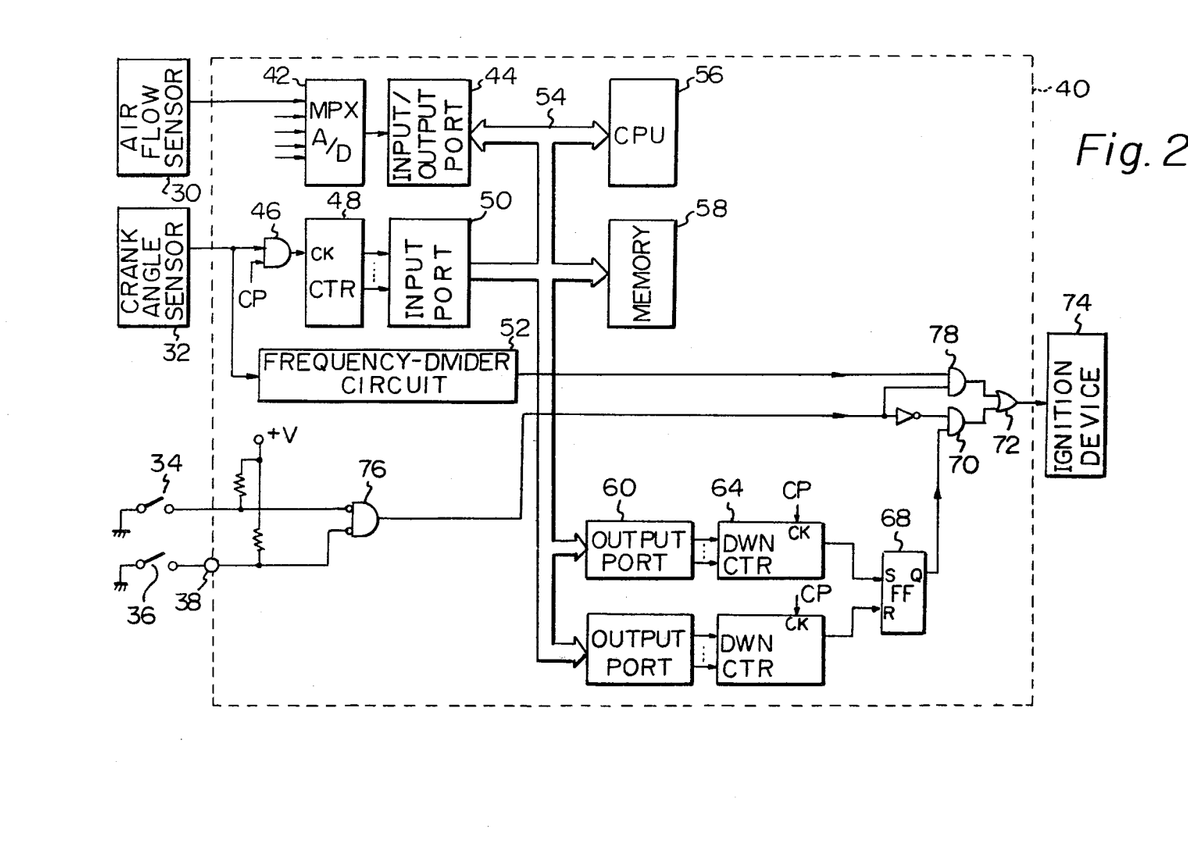
FIG. 2 is a block diagram illustrating an embodiment of the ignition control system in which the present invention is used.

FIG. 2 is a block diagram illustrating the embodiment of the present invention. According to this embodiment, the ignition timing is calculated from the rotational speed of the engine and from the flow rate of the intake air, and an idle switch which turns on when the throttle valve is at the idling position is used as a parameter sensor for detecting whether the engine is in the idling condition or not.

In FIG. 2, reference numeral 30 denotes an air flow sensor which detects the flow rate of the air sucked into the engine and which produces a voltage corresponding to the detected value, and 32 denotes a crank angle sensor which produces a crank angle signal having the logic level of "1" or "0". The logical level of the crank angle signal is inverted every time the crank shaft of the engine has turned on by a predetermined angle, for example, by 30° CA. Furthermore, inversion timings of the crank angle signal are in synchronism with the top dead center of each of the cylinders. In FIG. 2, reference numeral 34 denotes an idle switch which turns on only when the throttle valve is at the idling position, and 36 denotes a switch for servicing the ignition timing, which is connected to an IS terminal 38 of an electronic control unit 40.

A voltage signal from the air flow sensor 30 is applied to an A/D converter 42 having a multiplexing function in the electronic control unit 40. The applied signal is converted into a signal in the form of a binary number, and fed to an input/output port 44 of a microcomputer. The A/D converter 42 may be further served with voltage signals from the sensors that are not illustrated.

A crank angle signal from the crank angle sensor 32 is applied to an AND circuit 46 in the electronic control unit 40. The AND circuit 46 is opened only when the crank angle signal assumes the logic level of "1", i.e., only during a period which is required by the crank shaft to rotate by an angle of 30°. During this period, clock pulses CP applied to the AND circuit 46 are applied to a binary counter 48 where the number of the clock pulses applied thereto is counted. Consequently, the content of the binary counter 48 assumes a value that corresponds to the rotational speed of the engine, and this value is fed to an input port 50. The crank angle signal from the crank angle sensor 32 is further fed to a frequency-divider circuit 52 where the frequency is divided by a predetermined number (divided by four in the case of a four-cycle six-cylinder engine) to form ignition signals for fixing the ignition timing to the top dead center in the compression stroke of each of the cylinders.

The input/output port 44 and the input port 50 are connected to a central processing unit (CPU) 56 and a memory 58 consisting of ROM and RAM, via a common bus 54 which is also connected to output ports 60 and 62. Calculation data related to the ignition timing is fed from the CPU 56 to the output port 60, and calculation data related to the timing for initiating the flow of current is fed from the CPU 56 to the output port 62. The data fed to the output ports 60 and 62 are loaded to presettable down counters 64 and 66, and are counted down in response to the clock pulses CP. A flip-flop 68 is set when the content of the down counter 64 becomes zero, and is reset when the content of the down counter 66 becomes zero.

When an AND circuit 70 is open, the output Q of the flip-flop 68 is fed as an ignition signal to an ignition device 74 via an OR circuit 72. The primary current to the ignition coil is interrupted when the flip-flop 68 is set, and the primary current is allowed to flow when the flip-flop 68 is reset. The ignition device 74 consists of an igniter, an ignition coil, a distributor, and spark plugs.

Figure 3:
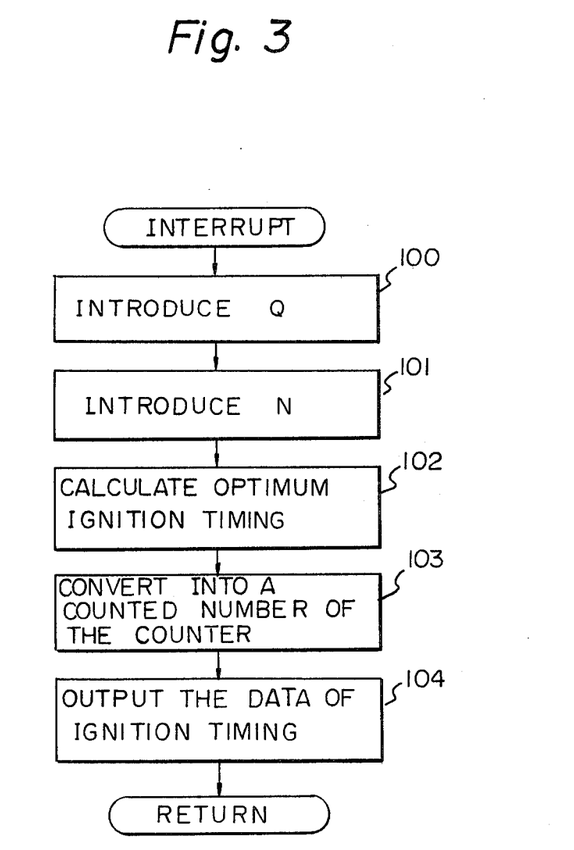
FIG. 3 is a flow diagram illustrating a control program of the microcomputer in the system of FIG. 2.
Figure 4:
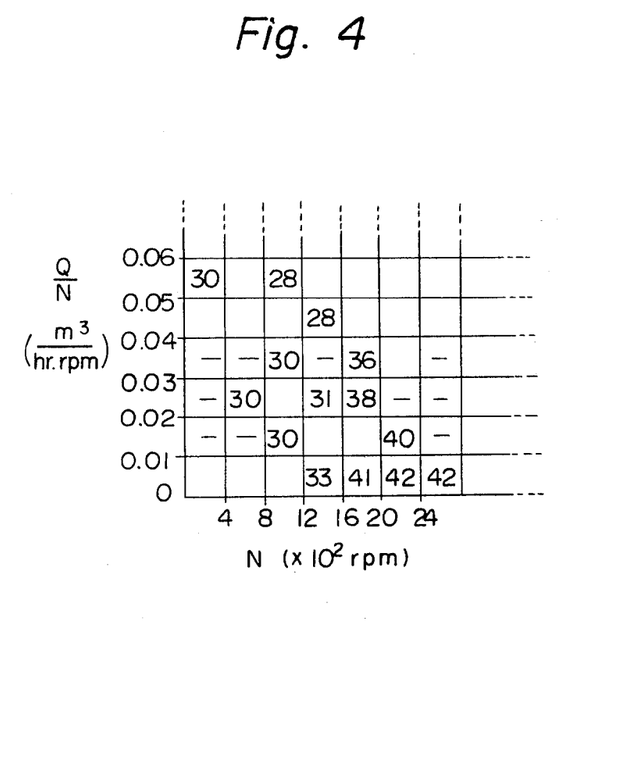
FIG. 4 is a map diagram illustrating the relationship of the spark advance angle relative to Q/N and N.

The CPU 56 executes an interrupt processing routine for calculating the ignition timing, as shown in FIG. 3, every time the crank shaft has rotated to a predetermined reference position or every time a predetermined period of time has elapsed. First, at points 100 and 101, the CPU 56 introduce the data Q related to the flow rate of the intake air and the data N related to the rotational speed of the engine, which data are supplied from the input/output port 44 and the input port 50. Then, at a point 102, the CPU 56 calculates an optimum ignition timing from these data. A variety of methods have been known to calculate the optimum ignition timing. For example, the spark advance angle can be found by mapping according to a function which represents the relationship of the spark advance angle with respect to N and Q/N, which function has been stored beforehand in the ROM, as shown in FIG. 4. Then, at a point 103, the CPU 56 calculates a crank angle between the calculated spark advance angle and a reference angular position, also it calculates a time required by the crank shaft to turn the calculated crank angle, and converts the calculated time into a counted number of the down counter 64. At a point 104, the data of ignition timing obtained by the above conversion at the point 103 is fed to an output port 60. The CPU 56 further calculates the data related to the timing for flowing the current to the ignition coil based upon the above-mentioned data related to the ignition timing in a customary manner, and produces the calculated value to the output port 62. Consequently, the ignition signal is produced from the flip-flop 68 as mentioned earlier.

The signal from the idle switch 34 and the IS signal which is applied from the switch 36 to the IS terminal 38, are fed to a NAND circuit 76 in the electronic control unit 40. Therefore, the output of the NAND circuit 76 assumes the logic level "1" only when the idle switch 34 is turned on and the switch 36 is turned on to feed the IS signal to the IS terminal 38. The output of the level of "1" of the NAND circuit 76 serves as a signal for instructing the fixed ignition timing, and causes the AND circuit 78 to open and the AND circuit 70 to close. In this case, therefore, the ignition signal of the fixed ignition timing from the frequency-divider circuit 52 is fed to the ignition device 74. Even when the IS terminal 38 is left grounded, the output of the NAND circuit 76 assumes the logic level of "0" if the idle switch 34 is turned off. Accordingly, the AND circuit 78 is closed, the AND circuit 70 is opened, and ordinary ignition signals are fed from the flip-flop 68 to the ignition device 74. Therefore, even when the switch 36 is inadvertently left on the "on" state or even when the detachable connector is inadvertently left connected to the IS terminal 38, the function of the fixed ignition timing is discontinued if the throttle valve is opened. Consequently, it is possible to reliably prevent the engine from being overheated, to prevent the occurrence of misfire, or to prevent the ignition system from being damaged by the heat.

Figure 5:
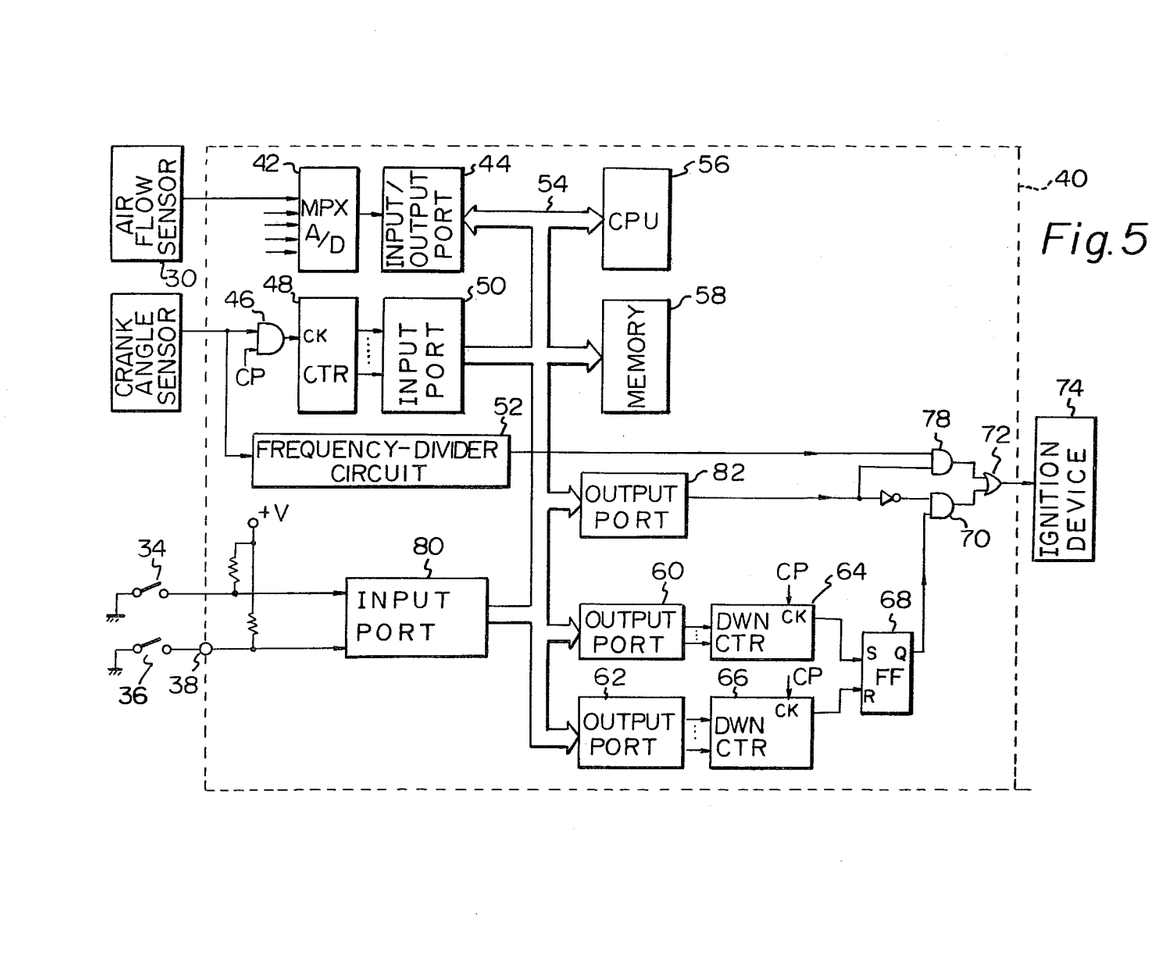
FIG. 5 is a block diagram illustrating another embodiment of the ignition control system according to the present invention.
Figure 6:
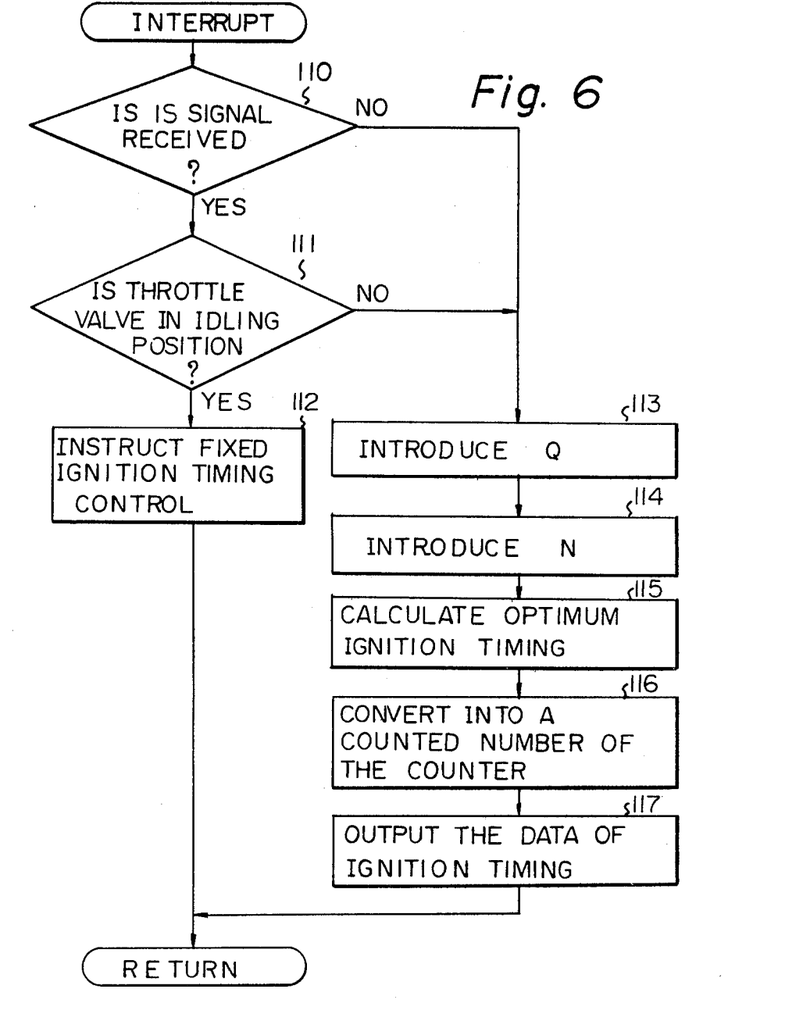
FIG. 6 is a flow diagram illutrating a control program of the microcomputer in the system of FIG. 5.

FIG. 5 is a block diagram which illustrates another embodiment according to the present invention. According to this embodiment, the function of logic operation of the NAND circuit 76 in the embodiment of FIG. 2 is performed by the software technique using a microcomputer. Referring to FIG. 5, therefore, the signal from the idle switch 34 and the IS signal which is applied to the IS terminal 38 are fed to an input port 80. Further, the opening and closure of the AND circuits 70 and 78 are controlled depending upon whether a signal for instructing the fixed ignition timing control is produced from an output port 82 or not. In this embodiment, the CPU 56 executes the interrupt processing routine for calculating the ignition timing that is shown in FIG. 6 at every predetermined crank angular position or at every predetermined period of time. First, at a point 110, the CPU 56 discriminates whether the IS signal of the logic level of "0" is fed from the IS terminal 38 to a predetermined bit position of the input port 80. When the IS signal is fed to the predetermined bit position, the program proceeds to a point 111 where it discriminates whether the idle switch 34 is turned on and the signal of the logic level of "0" is fed to a predetermined bit position of the input port 80. When the signal of the logic level of "0" has been fed to the predetermined bit position, the program proceeds to a point 112. At the point 112, the CPU 56 produces a signal of the logic level of "1" to the output port 82 to instruct a fixed ignition timing control. Therefore, the AND circuit 70 is closed, the AND circuit 78 is opened, and an ignition signal of fixed ignition timing is sent to the ignition device 74. When it is discriminated at the point 110 that the IS signal has not been received, or when it is discriminated at the point 111 that the idle switch 34 is turned off, the CPU 56 executes the processing routine of points 113 to 117 which have quite the same processing contents as those of the points 100 to 104 of FIG. 3, respectively. Namely, the optimum ignition timing is calculated depending upon the flow rate of the intake air and the rotational speed of the engine. Therefore, when the IS signal has not been introduced or when the idle switch 34 is turned off, the ignition signal for instructing ordinary ignition timing is fed to the ignition device 74. Other setups and functions of this embodiment are quite the same as those of the embodiment of FIG. 2. This embodiment further gives almost the same effects as those of the embodiment of FIG. 2.

In the aforementioned embodiments of FIGS. 2 and 5, whether the throttle valve is at the idling position or not was detected as a parameter for finding the idling condition of the engine. However, it is also possible to easily carry out the control the same as those of the above embodiments even when other engine parameters mentioned in conjunction with FIG. 1 are used, by simply modifying portions of the embodiments of FIGS. 2 and 5.

According to the present invention as illustrated in detail in the foregoing, when a predetermined engine parameter indicates the fact that the engine is not in the idling condition, the control for fixed ignition timing is discontinued, and the ignition timing is controlled depending upon the operation conditions of the engine. Therefore, even when the engine is operated without turning off the servicing mechanism for setting the ignition timing to the fixed value, there develops no such probability that the engine will overheat, misfire or that the ignition system will be damaged by heat.

As many widely different embodiments of the present invention may be constructed without departing from the spirit and scope of the present invention, it should be understood that the present invention is not limited to the specific embodiments described in this specification, except as defined in the appended claims.

We claim:

1. A method of controlling the ignition timing of an internal combustion engine having a predetermined input terminal for servicing the ignition timing, said method comprising the steps of:

detecting the operating condition of the engine and producing at least one first electrical signal which indicates the detected operating condition;

calculating, in response to the produced first electrical signal, a spark advance angle which corresponds to an optimum ignition timing at the detected operating condition;

detecting whether or not the engine is in the idling condition, to produce a second electrical signal when the engine is in the idling condition;

detecting whether or not a predetermined electrical signal is applied to said service input terminal and producing a third electrical signal when said predetermined electrical signal is applied;

in response to said second and third electrical signals, when the predetermined electrical signal is not applied to said service input terminal and when the predetermined electrical signal is applied to said service input terminal but the engine is not in the idling condition, adjusting the timing of sparks applied to the engine depending upon said calculated spark advance angle; and in response to said second and third electrical signals, when the predetermined electrical signal is applied when the engine is in the idling condition, setting the timing of sparks applied to the engine to a predetermined fixed timing.

2. A method as claimed in claim 1, wherein said sparks timing setting step includes a step of setting the timing of sparks applied to the engine to said predetermined fixed timing only when both of said second and third electrical signals are produced.

3. A method as claimed in claim 1, wherein said engine has an intake manifold and said operating condition detection step includes steps of:
detecting the rotational speed of the engine and producing an electrical signal which indicates the detected rotational speed; and
detecting one of the flow rate of air sucked into the engine and the pneumatic pressure in the intake manifold and producing an electrical signal related thereto.

4. A method as claimed in claim 1, wherein said engine has a throttle valve and said idling condition detection step includes a step of detecting whether or not the throttle valve is in the idle position and producing said second electrical signal when the throttle valve is in the idle position.

5. A method as claimed in claim 1, wherein said idling condition detection step includes a step of detecting whether or not the flow rate of air sucked into the engine is larger than a predetermined value and producing said second electrical signal when the flow rate of the air is not larger than the predetermined value.

6. A method as claimed in claim 1, wherein said idling condition detection step includes a step of detecting whether or not the rotational speed of the engine is higher than a predetermined value and producing said second electrical signal when the rotational speed is not higher than the predetermined value.

7. A method as claimed in claim 1, wherein said engine has an intake manifold and said idling condition detection step includes a step of detecting whether or not the absolute pneumatic pressure in the intake manifold is higher than a predetermined value and producing said second electrical signal when the absolute pneumatic pressure is higher than the predetermined value.

8. A method as claimed in claim 1, wherein said engine has an automatic transmission and said idling condition detection step includes a step of detecting whether or not the automatic transmission is shifted into one of the neutral range and the parking range and producing said second electrical signal when the shift position is in one of the neutral range and the parking range.

9. A method as claimed in claim 1, wherein said idling condition detection step includes a step of detecting whether or not the vehicle speed is higher than a predetermined value and producing said second electrical signal when the vehicle speed is not higher than the predetermined value.

10. Apparatus for controlling the ignition timing of an internal combustion engine comprising:
means for detecting the operating condition of the engine and producing at least one first electrical signal which indicates the detected operating condition;
means for calculating, in response to the produced first electrical signal, a spark advance angle which corresponds to an optimum ignition timing at the detected operating condition;
means for detecting whether or not the engine is in the idling condition and producing a second electrical signal when the engine is in the idling condition;
a service input terminal for servicing the ignition timing of said engine;
means for detecting whether or not a predetermined electrical signal is applied to said service input terminal and producing a third electrical signal when said predetermined electrical signal is applied; and
control means responsive to said second and third electrical signals, for adjusting the timing of sparks applied to the engine in response to said calculated spark advance angle when said second signal is not produced, independent of said third signal, and setting the timing of sparks applied to the engine to a predetermined fixed timing when both said second and third signals are produced.

11. Apparatus as in claim 10, wherein said control means is also for setting the timing of sparks applied to the engine to a predetermined fixed timing only when both said second and third electrical signals produced.

12. Apparatus as in claim 10, wherein said engine has an intake manifold and said operating condition detection means includes:
means for detecting the rotational speed of the engine and producing an electrical signal which indicates the detected rotational speed; and
means for detecting one of the flow rate of air sucked into the engine and the pneumatic pressure in the intake manifold and producing an electrical signal related thereto.

13. Apparatus as in claim 10, wherein said engine has a throttle valve and said idling condition detecting means includes means for detecting whether or not the throttle valve is in the idle position and producing said second electrical signal when the throttle valve is in the idle position.

14. Apparatus as in claim 10, wherein said idling condition detecting means includes means for detecting whether or not the flow rate of air sucked into the engine is larger than a predetermined value and producing said second electrical signal when the flow rate of the air is not larger than the predetermined value.

15. Apparatus as in claim 10, wherein said idling condition detecting means includes means for detecting whether or not the rotational speed of the engine is higher than a predetermined value and producing said second electrical signal when the rotational speed is not higher than the predetermined value.

16. Apparatus as in claim 10, wherein said engine has an intake manifold and said idling condition detecting means includes means for detecting whether or not the absolute pneumatic pressure in the intake manifold is higher than a predetermined value and producing said second electrical signal when the absolute pneumatic pressure is higher than the predetermined value.

17. Apparatus as in claim 10, wherein said engine has an automatic transmission and said idling condition detecting means includes means for detecting whether or not the automatic transmission is shifted into one of a neutral range and a parking range and producing said second electrical signal when the shift position is in one of the neutral range and the parking range.

18. Apparatus as in claim 10, wherein said idling condition detecting means includes means for detecting whether or not the vehicle speed is higher than a predetermined value and producing said second electrical signal when the vehicle speed is not higher than a predetermined value.

* * * * *